US012511080B1

(12) United States Patent
Zhang et al.

(10) Patent No.: US 12,511,080 B1
(45) Date of Patent: Dec. 30, 2025

(54) BLOCK FAMILY MANAGEMENT FOR A VIRTUAL BLOCK

(71) Applicant: MICRON TECHNOLOGY, INC., Boise, ID (US)

(72) Inventors: Peng Zhang, Los Altos, CA (US); Murong Lang, San Jose, CA (US); Zhenming Zhou, San Jose, CA (US); Lei Lin, Freemont, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/820,060

(22) Filed: Aug. 29, 2024

(51) Int. Cl.
*G06F 3/06* (2006.01)

(52) U.S. Cl.
CPC .......... *G06F 3/0667* (2013.01); *G06F 3/0604* (2013.01); *G06F 3/064* (2013.01); *G06F 3/0679* (2013.01)

(58) Field of Classification Search
CPC ...... G06F 3/0667; G06F 3/0604; G06F 3/064; G06F 3/0679
See application file for complete search history.

(56) References Cited

U.S. PATENT DOCUMENTS

| | | | |
|---|---|---|---|
| 8,208,322 B2 | 6/2012 | Gorobets | |
| 9,728,278 B2 | 8/2017 | Muchherla et al. | |
| 11,782,627 B2 | 10/2023 | Muchherla et al. | |
| 11,783,901 B2 | 10/2023 | Muchherla et al. | |
| 2015/0187442 A1* | 7/2015 | Sivasankaran | G11C 29/82 365/185.09 |
| 2019/0205043 A1* | 7/2019 | Huang | G06F 12/1009 |
| 2020/0365228 A1 | 11/2020 | Cadloni et al. | |
| 2024/0038311 A1 | 2/2024 | Lien et al. | |
| 2024/0185924 A1 | 6/2024 | Lien et al. | |
| 2024/0185935 A1 | 6/2024 | Lien et al. | |

* cited by examiner

*Primary Examiner* — Francisco A Grullon
(74) *Attorney, Agent, or Firm* — Tarolli, Sundheim, Covell & Tummino LLP

(57) ABSTRACT

An example includes a method for performing a block family (BF) scan operation of a memory device. The method includes performing a first block family error avoidance (BFEA) scan via a controller on a wordline of a first fractional good block of a virtual block. The method also includes performing a second BFEA scan via the controller on a wordline of a second fractional good block of the virtual block. The method also includes determining a BF bin number for each of the first and second fractional good blocks via the controller based on the first and second BFEA scans. The method further includes refreshing data stored in the virtual block via the controller based on the respective BF bin numbers of the first and second fractional good blocks.

20 Claims, 8 Drawing Sheets

BLOCK FAMILY MANAGEMENT FOR A VIRTUAL BLOCK

TECHNICAL FIELD

This disclosure relates to memory devices, and particularly to block family management for a virtual block.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells. However, for certain types of memory cells (e.g., in a flash memory), the longer the duration of time that memory cells store data, the more the memory cells experience charge loss that can affect the read characteristics of the memory cell.

DETAILED DESCRIPTION

Figure 1A:
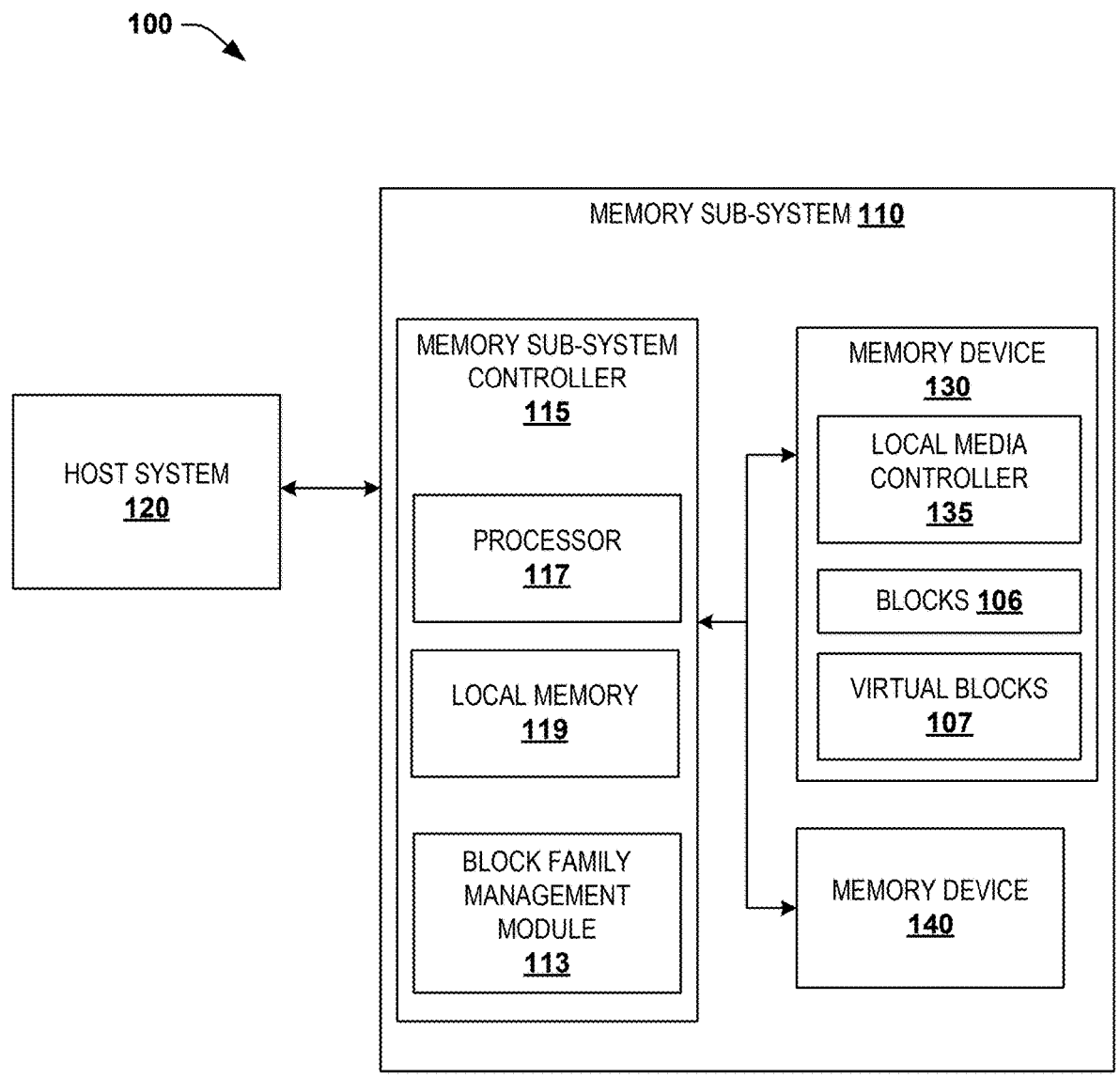
FIG. 1A illustrates system for decoding data from a memory sub-system.

This disclosure relates to memory devices, and particularly to block family management for a virtual block. A manner of managing block families, particularly for a virtual block, is described herein for a block family error avoidance (BFEA) scan operation of a block of memory. As described herein, to manage the BF of a virtual block, one or more codewords of each fractional good block of the virtual block are selected for a BF scan.

The term "BF scan" refers herein to providing a scan of a physical block or virtual block to determine charge loss of the memory cells of the respective physical block or virtual block. As described herein, the term BFEA scan operation corresponds to providing BF scans to multiple blocks of a memory device for managing the block families of the blocks of the memory device. As described herein, the term "virtual block" refers to a logically connected set of fractional good blocks that are provided from two or more separate physical blocks. As described herein, the term "fractional good block" refers to a deck or set of decks that are operational on a physical block, with the physical block also including a deck or set of decks that are defective, and thus non-operational. The term "half good block (HGB)" is used frequently herein to describe an operational deck on a physical block, with the physical block also including another deck that is non-operational. However, the term "fractional good block" can also refer to an operational deck on a physical block that includes more than two decks (e.g., three decks ("third good block (TGB)") or more).

Every time a physical block of memory is read, a high amplitude read voltage pulse is applied to the physical block. Over a large quantity of read operations, the high amplitude read pulses can result in read disturb (RD) stress and read disturb charge loss (RDCL), each of which can deleteriously affect read performances of the memory cells. For example, RD stress can alter the voltage thresholds of a memory cells (e.g., particularly at level zero), thereby resulting in a greater error rate in the data that is read from the memory cells. As another example, RDCL can result in distortion and decrease of charge distributions of voltage thresholds at higher voltage levels (e.g., levels six and seven).

For a physical block that includes multiple decks, each of the decks can exhibit the effects of RD stress and/or RDCL, even if one of the decks experiences significantly more read operations than the other(s). In other words, the high amplitude read pulses provided to one deck of a physical block can affect the entire physical block with respect to RD stress and/or RDCL. However, because a virtual block is composed of decks from different physical blocks, and thus multiple fractional good blocks, read operations performed on the virtual block can result in uneven amounts of RD stress and/or RDCL between the different fractional good blocks of the virtual block. In other words, if one of the fractional good blocks experiences significantly greater read operations than the other fractional good block(s), the respective fractional good block can have a corresponding significantly greater RD stress and/or RDCL than the other fractional good block(s). Such disparate effects of RD stress and/or RDCL can result in uneven read characteristics between the fractional good blocks of the virtual block.

To account for disparate amounts of RD stress and/or RDCL between the fractional good blocks, the controller can provide a BFEA scan operation to each of the fractional good blocks on the virtual block to determine the charge loss of each of the fractional good blocks individually. For example, read operations can be performed at different times on the different fractional good blocks of a virtual block, thereby resulting in disparate amounts of charge loss between the different fractional good blocks of the virtual block. Furthermore, the effects of RD stress and/or RDCL can affect the fractional good blocks of the virtual block differently based on the quantity of read operations performed on the physical blocks from which each of the fractional good blocks is provided. Therefore, the controller can determine a BF bin number (also referred to as "BF identifier" or "BF") of each of the fractional good blocks of the virtual block.

The controller can thus determine whether or not to refresh the data of the virtual block based on a difference between the BF bin numbers of the respective fractional good blocks. For example, the controller can compare a difference between the BF bin numbers (e.g., the numerical identifiers of the BF bin numbers) of the respective fractional good blocks with a BF threshold. If the difference between the BF bin numbers of the respective fractional good blocks of the virtual block are greater than the BF threshold, the controller can determine that the data in the virtual block should be refreshed. As an example, the controller can thus fold the data from the virtual block to a different portion of the memory device to refresh the data. However, if the difference between the BF bin numbers is less than the BF threshold, the controller can update the BF bin numbers of the respective fractional good blocks and maintain the data stored in the virtual block. In this manner, the controller can determine if the fractional good blocks of the virtual block have respective different charge losses that require different read threshold voltages, thereby mitigating trigger risks and bit errors of the data stored therein.

A memory sub-system refers to a storage device, a memory module or some combination thereof. The memory sub-system includes a memory device or multiple memory devices that store data. The memory devices could be volatile or non-volatile memory devices. Some examples of a memory sub-system include high density non-volatile memory devices where retention of data is desired during intervals of time where no power is supplied to the memory device. One example of a non-volatile memory device is a not-AND (NAND) memory device. A non-volatile memory device is a package that includes a die(s). Each such die can include a plane(s). For some types of non-volatile memory devices (e.g., NAND memory devices), each plane includes a set of physical blocks, and each physical block includes a set of pages. Each page includes a set of memory cells, which are commonly referred to as cells. A cell is an electronic circuit that stores information. A cell stores one or more bits of binary information and has various logic states that correlate to the number of bits being stored. The logic states are be represented by binary values, such as '0' and '1', or as combinations of such values, such as '00', '01', '10' and '11'.

A memory device includes multiple cells arranged in a two-dimensional or a three-dimensional array. In some examples, memory cells are formed on a silicon wafer in an array of columns connected by conductive lines (also referred to as bitlines, or BLs) and rows connected by conductive lines (also referred to as wordlines or WLs). A wordline is a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory devices.

When data is stored in memory, certain algorithms can detect and correct a number of errors in the stored data. Error correction code (ECC) encodes data in such a way that errors in the data can be identified and corrected when the data is decoded. For example, data strings can be encoded by an ECC encoder by adding a number of redundant and/or parity bits to create corresponding codewords. When an original data string is to be retrieved from the memory, an ECC decoder can use the corresponding codewords to identify bit errors in the encoded data string. If bit errors are present, one or more ECC operations can be employed to correct the bit errors and to recover the original data string. In addition to outputting error-checked and/or error-corrected data, some implementations of the ECC can also generate metadata regarding an ECC decode operation.

As described herein, a temporal voltage shift can occur for the threshold voltages associated with reading data from memory cells. The temporal voltage shift can be selectively tracked for a programmed set of memory cells grouped by block families (BFs), and appropriate voltage offsets, which are based on block affiliation with a certain block family, can be applied to the base read levels in order to perform read operations. As an example, a given data block typically can provide a valid open state to allow data to be written into the block for only a limited time. Data written into the given block can thus undergo similar data retention characteristics, which can be tracked by a BF bin number. As described herein, the terms "block family" or "BF" herein refers to a possibly non-contiguous set of memory that have been programmed within a specified time window and temperature window, and thus are expected to exhibit similar or correlated changes in their respective data state metrics. A block family can be made with any granularity, containing only whole codewords, whole pages, whole super pages, or whole superblocks, or any combination of these. For example, a block family can include several superblocks of data. Thus, several blocks of data can be assigned a given common BF bin number based on the approximate times at which data is written into the respective blocks. A data state metric can refer to a quantity that is measured or inferred from the state of data stored on a memory device. Specifically, the data state metrics can reflect the state of the temporal voltage shift, the degree of read disturb (RD), read disturb charge loss (RDCL), and/or other measurable functions of the data state.

The memory sub-system can evaluate a position metric or other data state metric of memory cells of a page or block to determine the location of a specified voltage level distribution corresponding to a specified logical level (e.g., three-bit, or eight levels). This location can then be used to assign the page or block to a predefined threshold voltage offset bin, which includes a set of threshold voltage offset values that can be added to base read levels when performing a read operation. The page or block can be representative of a block family in some cases. An initial threshold voltage level exhibited by the memory cell immediately after programming can be referred to as a base read level. In some implementations, base read levels can be stored in the metadata of the memory device. The associations of pages or blocks with block families and block families and dies with threshold voltage offset bins can be stored in respective metadata tables maintained by the memory sub-system. Since the time elapsed after programming and temperature are factors affecting the temporal voltage shift, all blocks within a single block family are presumed to exhibit similar distributions of threshold voltage levels in memory cells, and thus would require the same voltage offsets to be applied to the base read levels for read operations.

Proper assignments of pages, blocks, and/or block families to predefined threshold voltage offset bins results in lower read bit error rates (RBER). As discussed, because the memory cells experience slow charge loss, which affects the voltage level distributions, the controller can perform a block family error avoidance (BFEA) scan periodically to check the location of the specified voltage level distribution for the pages or blocks, in order to calibrate assignments to the threshold voltage offset bins.

To account for disparate amounts of RD stress and/or RDCL between the fractional good blocks, the controller can provide a BFEA scan operation to each of the fractional good blocks on the virtual block to determine the charge loss of each of the fractional good blocks individually. For example, read operations can be performed at different times on the different fractional good blocks of a virtual block, thereby resulting in disparate amounts of charge loss between the different fractional good blocks of the virtual block. Furthermore, the effects of RD stress and/or RDCL can affect the fractional good blocks of the virtual block differently based on the quantity of read operations performed on the physical blocks from which each of the fractional good blocks is provided. Therefore, the controller can determine a BF bin number (also referred to as "BF identifier" or "BF") of each of the fractional good blocks of the virtual block.

FIG. 1A illustrates a system 100 that includes a memory sub-system 110 that can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1A illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-transitory computer readable media. The memory device 130 and the memory device 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) or higher, can store multiple bits per cell. In some examples, each of the memory device(s) 130 can include one or more arrays of memory cells such as SLCs, MLCs, TLCs, QLCs, PLCs or some combination thereof. In some examples, a particular memory device can include an SLC portion, an MLC portion, a TLC portion, a QLC portion and/or a PLC portion of memory cells. The memory cells of the memory device(s) 130 can be grouped as pages that can refer to a logical unit of the memory device used to store data. In some types of memory (e.g., NAND), pages can be grouped to form blocks 106. The blocks 106 can include sub-blocks, and can be organized across a set of planes of the memory device 130.

As an example, a block (sometime referred to herein as "physical block") 106 of the memory device 130 according to the present disclosure has at least two decks. A functional deck refers to a deck that satisfies criteria pertaining to a functionality of the deck. For example, the criteria can include that a metric of the deck (e.g., an average RBER) does not exceed a threshold value that is considered as an indication of a normal function of the deck. A defective deck refers to a deck that does not satisfy the criteria pertaining to the functionality of the deck. For example, the metric of the deck (e.g., an average RBER) does not exceed a threshold value that is considered as an indication of a normal function of the deck. The criteria used for the functional deck and the defective deck can be the same or different. In some implementations, a defective deck may be identified by program status failure.

A block 106 can be described as a full good block, which thus refers to a block 106 in which all of the decks are functional decks. A defective block 106 refers to a block that has only defective decks. However, as described herein, some physical blocks 106 can include both a functional deck and a defective deck. Such a physical block 106 therefore includes one or more fractional good blocks, such as a half good block (HGB) in an example of a physical block 106 that includes one functional deck and one defective deck. To improve yield and reduce costs in the memory device 130, one or more fractional good blocks of the blocks 106 can be logically combined to form virtual blocks 107 that operate substantially the same as a full good block 106 with respect to storing data, as well as read and write operations.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory device(s) 130 and other such operations. The memory sub-system controller 115 can include hardware such as one or more integrated circuits and/or discrete components, a buffer memory or some combination thereof. The hardware can include a digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or another suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory device(s) 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some examples, the memory device(s) 130 include local media controllers 135 that operate in concert with the memory sub-system controller 115 to execute operations on one or more memory cells of the memory device(s) 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

In operation, the host system 120 manages and controls the flow of data between itself and the memory sub-system 110, ensuring efficient data storage and retrieval operations. More generally, the host system 120 employs the memory sub-system 110 to write data to and read data from the memory sub-system 110. For instance, the host system 120 processes these request for reading and/or write data by interacting with the memory sub-system 110, managing the flow of data to and from the memory device 130 and/or the memory device 140 within the memory sub-system 110. This reading and writing of data enables operation of computing systems where data access and management is needed.

In various examples, the memory sub-system 110 includes a block family management module 113 that can manage the block families, and thus the corresponding voltage level offsets, of the memory device 130. In some examples, the memory sub-system controller 115 includes at least a portion of the block family management module 113. In some examples, the block family management module 113 is part of the host system 120, an application or an operating system. In other examples, local media controller 135 includes a portion of the block family management module 113 and is configured to perform the functionality described herein.

As described herein, the block family management module 113 can provide a block family error avoidance (BFEA) scan operation to each of the fractional good blocks of a virtual block to determine the charge loss of each of the fractional good blocks individually. For example, read operations can be performed at different times on the different fractional good blocks of a virtual block, thereby resulting in disparate amounts of charge loss between the different fractional good blocks of the virtual block. Furthermore, the effects of read disturb (RD) stress and/or read disturb charge loss (RDCL) can affect the fractional good blocks of the virtual block differently based on the quantity of read operations performed on the physical blocks from which each of the fractional good blocks is provided. Therefore, the block family management module 113 can determine a BF bin number of each of the fractional good blocks of the virtual block individually.

The block family management module 113 can thus determine whether or not to refresh the data of the virtual block based on a difference between the BF bin numbers of the respective fractional good blocks. For example, the block family management module 113 can compare a difference between the BF bin numbers (e.g., the numerical identifiers of the BF bin numbers) of the respective fractional good blocks with a BF threshold. If the difference between the BF bin numbers of the respective fractional good blocks of the virtual block are greater than the BF threshold, the block family management module 113 can determine that the data in the virtual block should be refreshed. As an example, the block family management module 113 can thus fold the data from the virtual block to a different portion of the memory device to refresh the data. However, if the difference between the BF bin numbers is less than the BF threshold, the block family management module 113 can update the BF bin numbers of the respective fractional good blocks and maintain the data stored in the virtual block. In this manner, the block family management module 113 can determine if the fractional good blocks of the virtual block have respective different charge losses that require different read threshold voltages, thereby mitigating trigger risks and bit errors of the data stored therein.

Figure 1B:
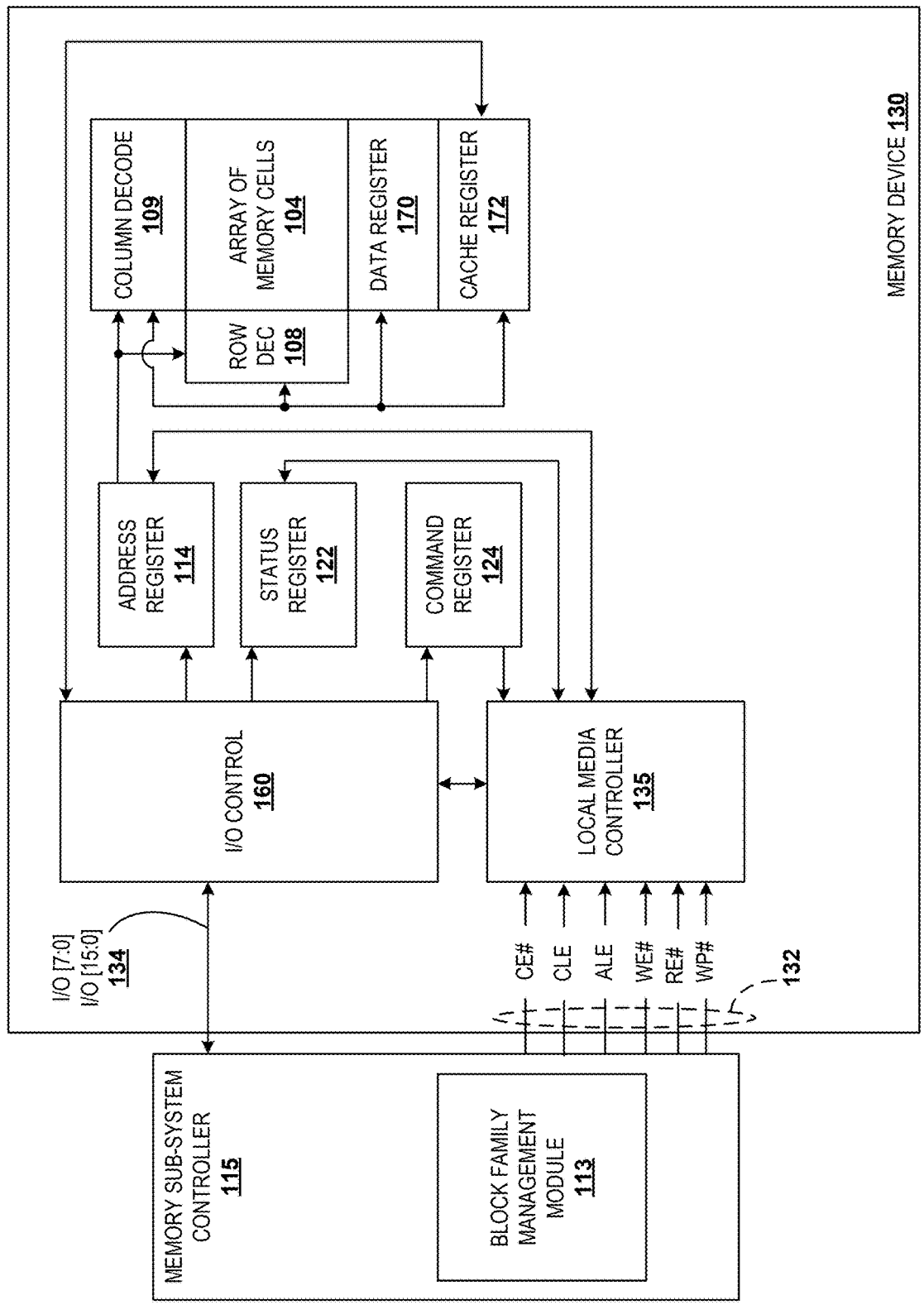
FIG. 1B illustrates a simplified block diagram of an example memory device in communication with a memory sub-system controller.

FIG. 1B illustrates a simplified block diagram of an example of a first apparatus, in the form of a memory device 130, in communication with an example of a second apparatus, in the form of a memory sub-system controller 115 of a memory sub-system (e.g., the memory sub-system 110 of FIG. 1A). Some examples of electronic systems include personal computers, personal digital assistants (PDAs), digital cameras, digital media players, digital recorders, games, appliances, vehicles, wireless devices, mobile telephones, etc. The memory sub-system controller 115 (e.g., a controller external to the memory device 130), can be a memory controller or other external host device.

The memory device 130 includes an array of memory cells 104 logically arranged in rows and columns. As an example, the memory cells 104 can be arranged in an assortment of multiple blocks, with each block including a set of sub-blocks. The blocks/sub-blocks are grouped together to form the planes of the memory device 130. The memory cells 104 form a non-transitory computer-readable medium. Memory cells of a logical row are connected to the same access line (e.g., a wordline) while memory cells of a logical column are selectively connected to the same data line (e.g., a bit line) in some examples. In some examples, a single access line is associated with more than one logical row of memory cells and a single data line may be associated with more than one logical column. Memory cells of at least a portion of the array of memory cells 104 are capable of being programmed to one of at least two target data states.

The memory device 130 includes row decode circuitry 108 and column decode circuitry 109 for decoding address signals. Address signals are received and decoded to access an array of memory cells 104 of the memory device 130. The memory device 130 also includes input/output (I/O) control circuitry 160 to manage input of commands, addresses and data to the memory device 130 as well as output of data and status information from the memory device 130. The memory device 130 has an address register 114 and is in communication with the I/O control circuitry 160, the row decode circuitry 108 and the column decode circuitry 109 to latch the address signals prior to decoding. The memory device 130 also includes a command register 124 in communication with the I/O control circuitry 160 and a local media controller 135 to latch incoming commands.

A controller (e.g., the local media controller 135 internal to the memory device 130) controls access to the array of memory cells 104 in response to the commands and generates status information for the external memory sub-system controller 115. For example, the local media controller 135 is configured to perform access operations (e.g., read operations, programming operations and/or erase operations) on the array of memory cells 104. The local media controller 135 is in communication with the row decode circuitry 108 and the column decode circuitry 109 to control the row decode circuitry 108 and the column decode circuitry 109 in response to the addresses.

As described above in the example of FIG. 1A, the block family management module 113 can implement a BFEA scan operation on the memory cells 104 of the memory device 130 that are organized into the fractional good blocks of each of the virtual blocks 107. The BFEA scan operation can be implemented on each fractional good block of a respective virtual block 107 of the memory device 130 to determine charge loss separately for each respective fractional good block of the virtual block 107, and can thus determine corresponding respective BF bin numbers. As described above, the difference between the BF bin numbers of each of the fractional good blocks can be compared with a BF threshold to determine whether or not to refresh the data stored in the respective virtual block 107.

The local media controller 135 is also in communication with a cache register 172. The cache register 172 latches data, either incoming or outgoing, as directed by the local media controller 135 to temporarily store data while the array of memory cells 104 is busy writing or reading, respectively, other data. During a programming operation (e.g., write operation), data is passable from the cache register 172 to the data register 170 for transfer to the array of memory cells 104, and new data can be latched in the cache register 172 from the I/O control circuitry 160. During a read operation, data is passable from the cache register 172 to the I/O control circuitry 160 for output to the memory sub-system controller 115. New data is passable from the data register 170 to the cache register 172. The cache register 172 and/or the data register 170 form (e.g., or form a portion of) a page buffer of the memory device 130. The page buffer includes sensing devices (not shown in FIG. 1B) to sense a data state of a memory cell of the array of memory cells 104. For example, the sensing devices sense a state of a data line connected to that memory cell. The memory device 130 also includes a status register 122 in communication with the I/O control circuitry 160 and the local media controller 135 to latch the status information for output to the memory sub-system controller 115.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE # and/or a write protect signal WP #. Additional or alternative control signals (not shown) can be further received over control link 132 depending upon the nature of the memory device 130. In some examples, the memory device 130 receives command signals (which represent commands), address signals (which represent addresses) and data signals (which represent data) from the memory sub-system controller 115 over a multiplexed input/output (I/O) bus 134 and outputs data to the memory sub-system controller 115 over the I/O bus 134.

In some examples, the commands are received over input/output (I/O) pins [7:0] of the I/O bus 134 at I/O control circuitry 160 and may then be written into the command register 124. The addresses are received over input/output (I/O) pins [7:0] of the I/O bus 134 at I/O control circuitry 160 and written into the address register 114. The data is receivable over input/output (I/O) pins [7:0] for an 8-bit device or input/output (I/O) pins [15:0] for a 16-bit device at I/O control circuitry 160 and is writable into the cache register 172. The data is subsequently written into the data register 170 for programming the array of memory cells 104 in some examples.

In some examples, the cache register 172 is omitted, and in such examples, the data is written directly into the data register 170. Additionally or alternatively, data is output over input/output (I/O) pins [7:0] for an 8-bit device or input/output (I/O) pins [15:0] for a 16-bit device. Moreover, it is noted that although reference is made to I/O pins, in other examples, a different conductive node providing for electrical connection to the memory device 130 by an external device (e.g., the memory sub-system controller 115), such as conductive pads or conductive bumps could be used in addition to or as a replacement for the I/O pins.

The example memory device 130 of FIG. 1B has been simplified. Moreover, in other examples, the functionality of the various block components described with reference to FIG. 1B are not segregated to distinct components or component portions of an integrated circuit device. For example, a single component or component portion of an integrated circuit device could be adapted to perform the functionality of more than one block component of FIG. 1B. Alternatively, components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) are useable in various examples.

Figure 2:
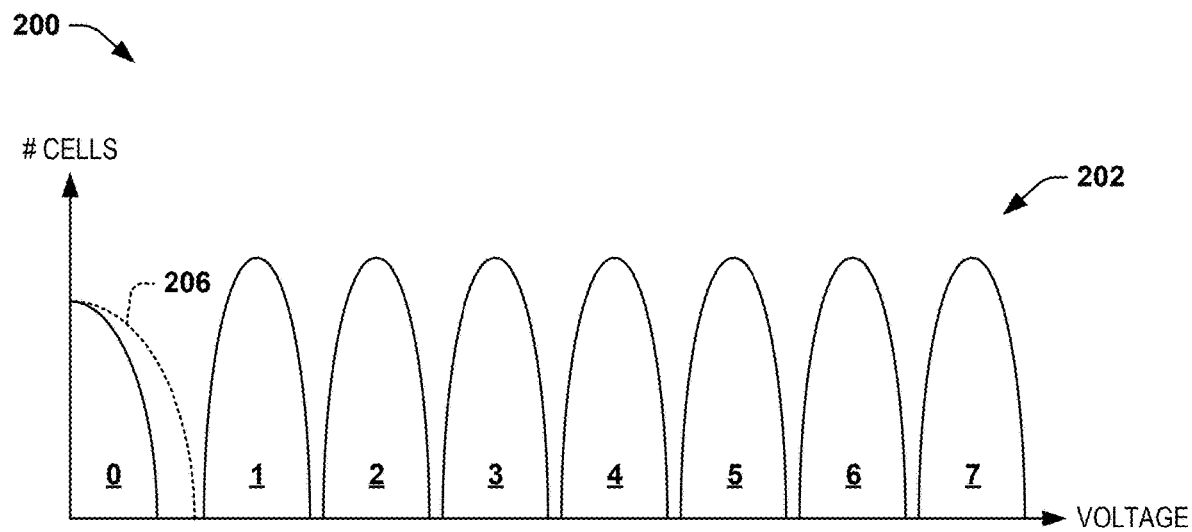
FIG. 2 illustrates an example diagram of voltage graphs for reading data.
Figure 2:
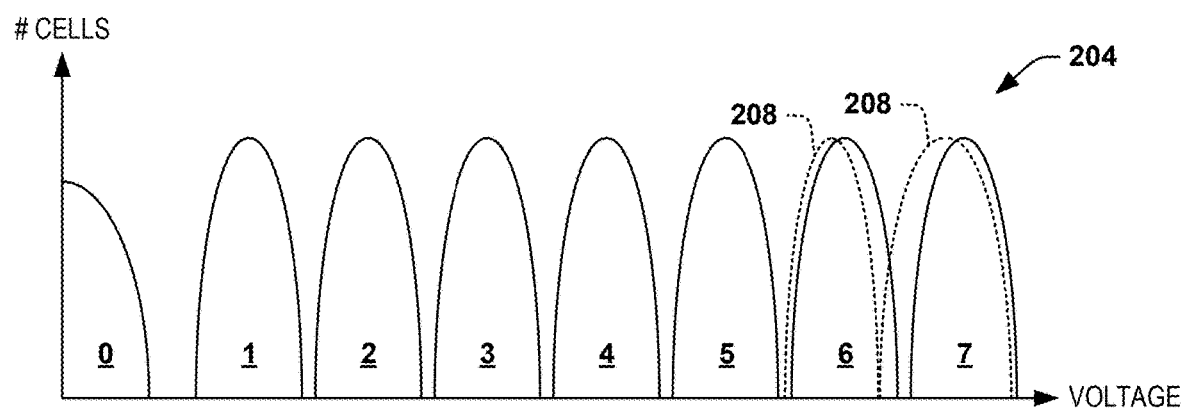

FIG. 2 illustrates an example diagram 200 of voltage graphs for reading data. The diagram 200 demonstrates a first voltage graph 202 and a second voltage graph 204. As an example, the voltage graphs 202 and 204 can correspond to read voltage levels (e.g., threshold voltages) for reading data from memory cells of the memory device 130 over a quantity of memory cells to be read. The read voltage levels can correspond to programmed states of the array of memory cells 104 of the memory device 130. The example shown in FIG. 2 represents three-bit, e.g., eight-state, memory cells. Therefore, the voltage levels represent eight target states to which the memory cells can be programmed. In the example of FIG. 2, the eight target states are labeled zero through seven (0-7).

As described above, every time a physical block 106 of the memory device 130 is read, a high amplitude read voltage pulse is applied to the physical block 106. Over a large quantity of read operations, the high amplitude read pulses can result in read disturb (RD) stress and read disturb charge loss (RDCL), each of which can deleteriously affect read performances of the memory cells 104.

For example, RD stress can alter the voltage thresholds of a memory cells, thereby resulting in a greater error rate in the data that is read from the memory cells. The first voltage graph 202 demonstrates the effects of RD stress. In the first voltage graph 202, the voltage of level 0 is demonstrated as shifting to a higher amplitude, demonstrated by the dotted line at 206. The shift of the voltage threshold of level 0 (e.g., and other lower levels) can cause bit errors during a read operation of the respective memory cell 104.

As another example, RDCL can result in distortion and decrease of charge distributions of voltage thresholds at higher voltage levels. The second voltage graph 204 demonstrates the effects of RDCL. In the second voltage graph 204, the respective voltages of levels 6 and 7 are demonstrated as shifting to a lower amplitude resulting from charge loss, demonstrated by the dotted line at 208. The shift of the voltage thresholds of levels 6 and 7 (e.g., and other higher levels) can also cause bit errors during a read operation of the respective memory cell 104. Additionally, the effects of RDCL can be more prominent at higher temperatures, thus introducing a temperature component into efforts to mitigate the deleterious effects of RDCL.

Figure 3A:
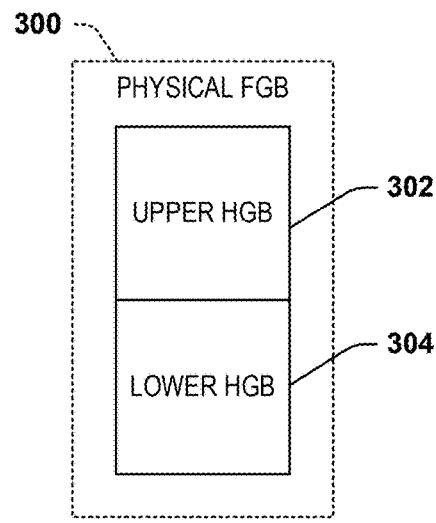
FIG. 3A illustrates an example diagram of a physical data block.

FIG. 3A illustrates an example diagram of a physical data block 300. The physical block ("PHYSICAL FGB") 300 can correspond to a physical block 106 in the memory device 130. In the example of FIG. 3A, the physical block 300 is a full good block (FGB) that includes a first deck that is a functional upper half good block (HGB) 302 and a second deck that is a functional lower HGB 304. Because the HGBs 302 and 304 are both functional, the memory sub-system controller 115 can implement read and write operations on either of the HGBs 302 and 304. Additionally, the virtual block control module 113 can arbitrarily select one of the HGBs 302 and 304 to provide a media scan operation on the wordline(s) therein. Each of the HGBs 302 and 304 of the physical FGB 300 can exhibit the effects of RD stress and/or RDCL even if one of the HGBs 302 and 304 experiences significantly more read operations than the other. In other words, the read pulses provided to one of the HGBs 302 and 304 affects the entire physical block, and thus the other one of the HGBs 302 and 304, with respect to RD stress and/or RDCL.

Figure 3B:
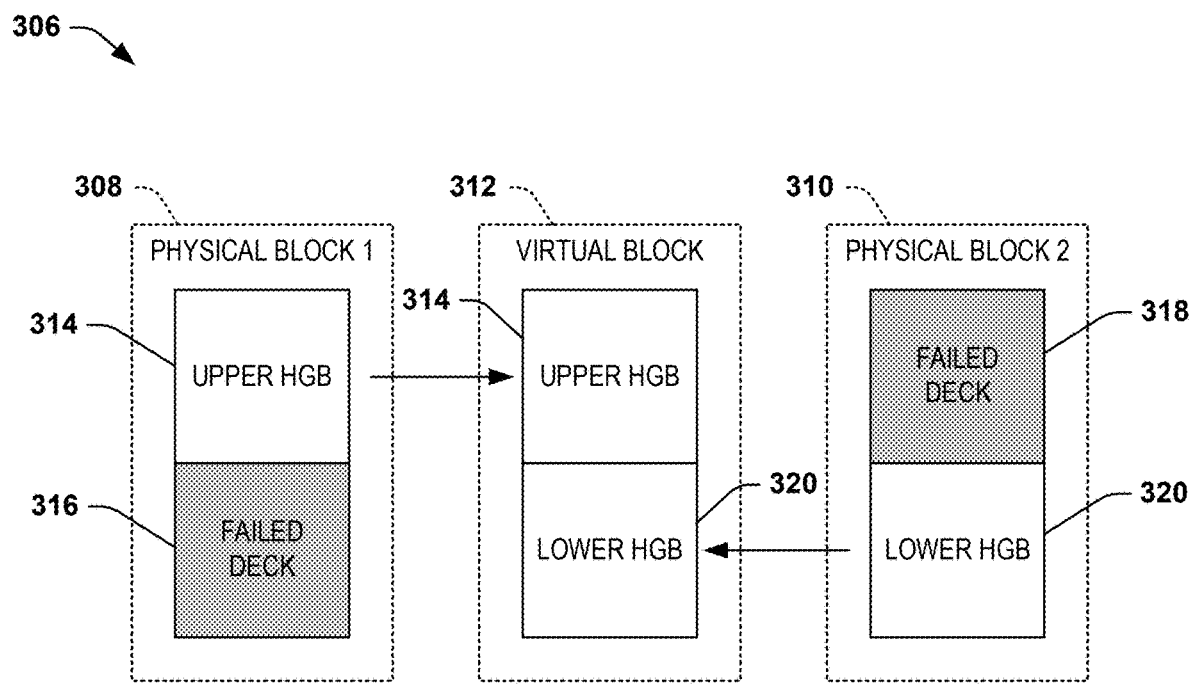
FIG. 3B illustrates an example diagram of generating a virtual data block.

FIG. 3B illustrates an example diagram 306 of generating a virtual block. The diagram 306 includes a physical block ("PHYSICAL BLOCK 1") 308, a physical block ("PHYSICAL BLOCK 2") 310, and a virtual block ("VIRTUAL BLOCK") 312. The physical blocks 308 and 310 each can correspond to a physical block 106 in the memory device 130, and the virtual block 312 can correspond to one of the virtual blocks 107 in the memory device 130.

In the example of FIG. 3B, the physical block 308 includes a first deck that is a functional upper HGB 314 and a second deck that is a non-functional defective ("FAILED") deck 316. Similarly, the physical block 310 includes a first deck that is a non-functional defective ("FAILED") deck 318 and a functional lower HGB 320. In order to optimize resources on the memory device 130, the first and second physical blocks 308 and 310 can be logically merged to form the virtual block 312. In the example of FIG. 3B, the upper HGB 314 and the lower HGB 320 can form the two decks of the virtual block 312, such that the virtual block 312 can operate substantially the same as the physical FGB 302.

However, because the virtual block 312 is composed of two decks from the respective different physical blocks 308 and 310, read operations performed on the virtual block 312 can result in uneven amounts of RD stress and/or RDCL between the different HGBs 314 and 320 of the virtual block 312. In other words, if one of the HGBs 314 and 320 experiences significantly greater read operations than the other one of the HGBs 314 and 320, the respective one of the HGBs 314 and 320 can have a corresponding significantly greater RD stress and/or RDCL than the other one of the HGBs 314 and 320. Such disparate effects of RD stress and/or RDCL can result in uneven read characteristics between the HGBs 314 and 320 of the virtual block 312.

Figure 4A:
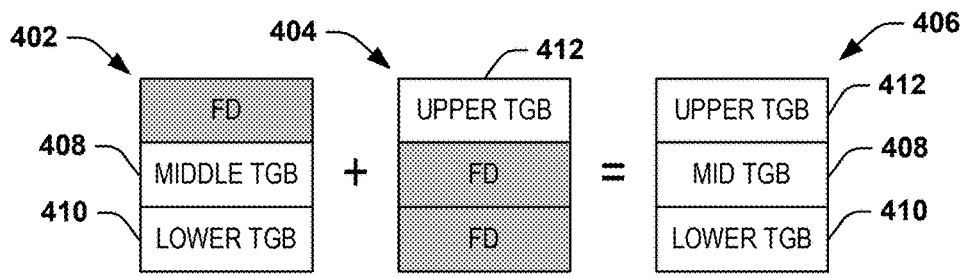
FIG. 4A illustrates another example diagram of generating a virtual data block.
Figure 4B:
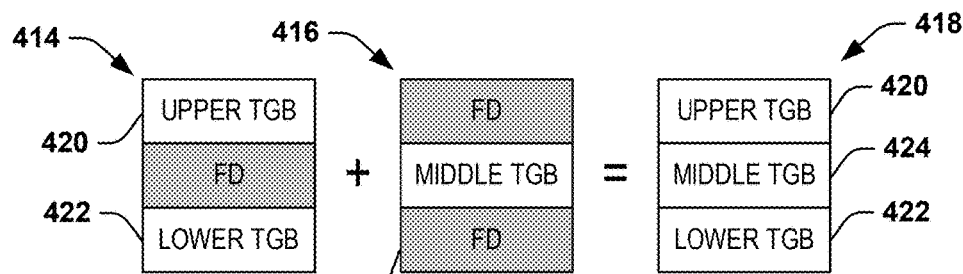
FIG. 4B illustrates another example diagram of generating a virtual data block.
Figure 4C:
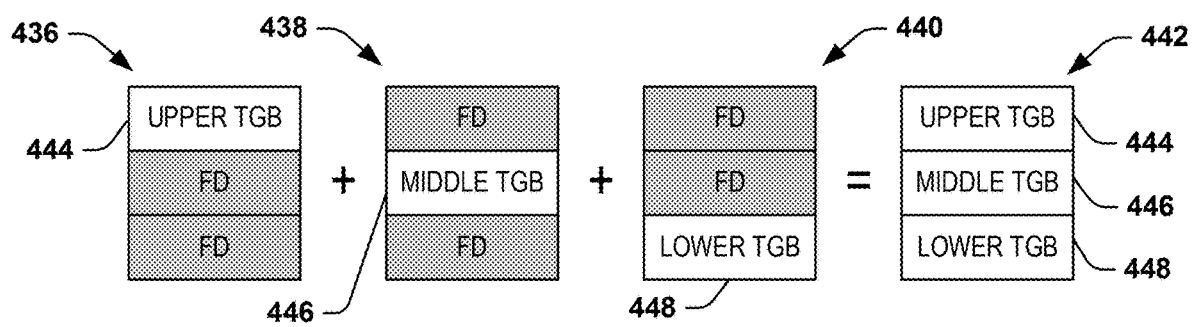
FIG. 4C illustrates another example diagram of generating a virtual data block.

FIGS. 4A through 4C illustrate additional examples of data blocks. The diagram 400 demonstrates a set of generated virtual blocks. In the example of FIGS. 4A through 4C, each of the blocks includes three decks instead of the two decks demonstrated in the example of FIGS. 3A and 3B.

FIG. 4A includes a first physical block 402 combined with a second physical block 404 to generate a virtual block 406. The first physical block 402 includes a failed upper deck, a middle third good block (TGB) 408, and a lower TGB 410. The second physical block 404 includes an upper TGB 412, a failed middle deck, and a failed lower deck. The virtual block 406 thus includes an upper TGB 412, a middle TGB 408, and a lower TGB 410.

FIG. 4B includes a first physical block 414 combined with a second physical block 416 to generate a virtual block 418. The first physical block 414 includes an upper TGB 420, a failed middle deck, and a lower TGB 422. The second physical block 416 includes a failed upper deck, a middle TGB 424, and a failed lower deck. The virtual block 418 thus includes an upper TGB 420, a middle TGB 424, and a lower TGB 422.

FIG. 4C includes a first physical block 436 combined with a second physical block 438 combined with a third physical block 440 to generate a virtual block 442. The first physical block 414 includes an upper TGB 444, a failed middle deck, and a failed lower deck. The second physical block 416 includes a failed upper deck, a middle TOB 446, and a failed lower deck. The third physical block 440 includes a failed upper deck, a failed middle deck, and a lower TGB 448. The virtual block 442 thus includes an upper TGB 444, a middle TGB 446, and a lower TGB 448.

Therefore, the diagram 400 demonstrates different variations of virtual blocks based on combinations of physical blocks. The example of FIGS. 4A through 4C are not limiting, such that other combinations of TGBs and failed decks are possible, as well as other quantities of decks in a given fractional good block.

Figure 5:
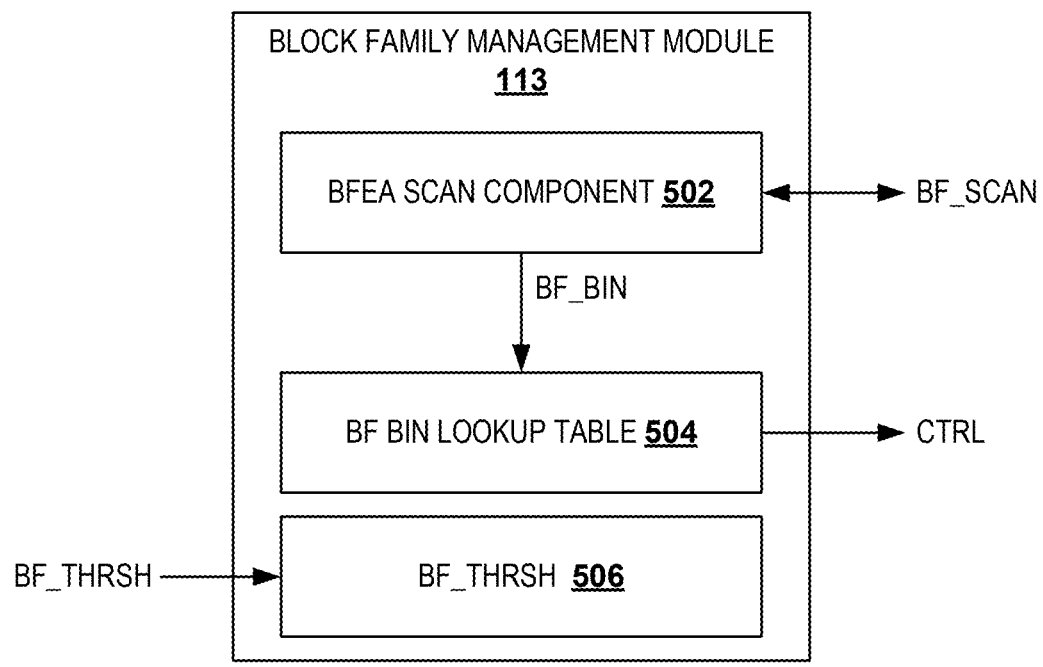
FIG. 5 illustrates a diagram of a block family management module.

FIG. 5 illustrates a diagram 500 of the block family management module 113. The block family management module 113 can implement the BFEA scan operation and to perform BF management of the blocks 106 of the memory device 130, including the virtual blocks 107, as described herein.

The block family management module 113 includes a BFEA scan component 502, a BF bin lookup table 504, and a BF threshold ("BF_THRSH") 506. The BFEA scan component 502 is configured to provide BF scanning of one or more wordlines of the blocks 106 and/or virtual blocks 107 of the memory device 130 during a BFEA scan operation. In the example of FIG. 5, the BF scan is demonstrated as "BF_SCAN" corresponding to the BFEA scan component 502 accessing a given block 106 or virtual block 107 to determine a charge loss of the wordline(s) thereof. As an example, a BF scan can determine the location of the specified voltage level distribution for the pages or blocks, in order to determine the threshold voltage offset bins. As an example, the BF scan BF_SCAN can determine a charge loss of the wordline(s) based on determining a bit read error rate (RBER) of the codeword stored on the wordline(s). As another example, the BF scan BF_SCAN can determine a charge loss of the wordline(s) based on determining a voltage shift (decrease) of the highest voltage level or voltage levels (e.g., level 7 or levels 6 and 7), thereby determining RDCL of the wordline(s).

The BFEA scan component 502 can provide the BF scan BF_SCAN to a physical block 106 that is an PGB by arbitrarily selecting the wordline(s) from any deck of the respective block 106 based on the commonality of temporal charge loss, RD stress, and/or RDCL to all decks of an FGB. However, as described herein, temporal charge loss, RD stress, and/or RDCL can be different for different fractional good blocks of a virtual block 107. Therefore, in response to determining that a selected block for a BF scan is a virtual block 107, the BFEA scan component 502 can provide the BF scan BF_SCAN to each fractional good block of the virtual block 107 to therefore determine the charge loss separately and individually for each of the fractional good blocks of the virtual block 107. Regardless of whether the selected block is a physical block 106 or a virtual block 107, the BFEA scan component 502 can determine the BF bin number of the block 106 or of each fractional good block of the virtual block 107 based on the voltage threshold values of the block 106 or of each fractional good block of the virtual block 107. The BF bin number entries can be stored in the BF bin lookup table 504, demonstrated in the example of FIG. 5 as a signal BF_BIN.

The BF bin lookup table 504 therefore includes the BF bin number entries of each of the blocks 106 and virtual blocks 107 of the memory device 130. The BF bin number entries can thus be implemented by the memory sub-system controller 115 to set the amplitude of read voltage levels based on the defined voltage threshold values of the respective BF bin number entries. In the example of FIG. 5, the BF bin lookup table 504 is demonstrated as providing a signal CTRL (e.g., to the memory sub-system controller 115) corresponding to the BF bin numbers that can be implemented by the memory sub-system controller 115 to set read voltage amplitudes during a data read operation. As an example, the BF bin number entries can include an aggregate BF bin number for a given virtual block 107, such that each of the fractional good blocks can be accessed in a data read operation by the same read voltage levels. The aggregate BF bin number of the virtual block 107 can be the BF bin number of one of the fractional good blocks of the virtual block 107, such that the same read voltage amplitudes can be applicable (or mostly applicable) to reading data from all of the fractional good blocks of the virtual block 107 within minimal bit errors, even if the BF bin numbers are slightly different between the fractional good blocks.

As described herein, however, if the difference between the BF bin number of each of the fractional good blocks is significantly different, then the read voltage levels that are applicable to one fractional good block may not be applicable to another fractional good block, which may result in significant bit errors in reading the data. Such a condition can result in trigger risks, in which ECC operations are implemented to provide error correction to the data read from the virtual block 107. By implementing frequent ECC operations, the operation of the memory sub-system controller 115 can be significantly slowed to accommodate the excessive processing capability required for the error correction.

Therefore, as described herein, the block family management module 113 can be configured to refresh the data in a virtual block 107 in response to determining that the BF bin numbers of the respective fractional good blocks of the virtual block 107 differ by greater than the predefined BF threshold 506. For a virtual block 107 with two HGBs, the difference is between the BF bin numbers of the respective HGBs. As another example, for a virtual block 107 with more than two fractional good blocks, the difference can be the greatest difference in respective BF bin numbers between any two of the fractional good blocks. For example, the BF threshold 506 can have a static value, or can have a programmable value, demonstrated as the BF threshold 506 being provided a signal BF_THRSH. For example, the BF threshold 506 can have a low integer value, such as 1. Therefore, by determining the individual BF bin numbers of the respective fractional good blocks of the virtual block 107, and by refreshing the data of the virtual block 107 in response to the difference of the BF bin numbers of the respective fractional good blocks of the virtual block 107 being greater than the BF threshold 506, the block family management module 113 can mitigate the effects of RDCL, corresponding bit errors, and associated trigger risks.

Figure 6:
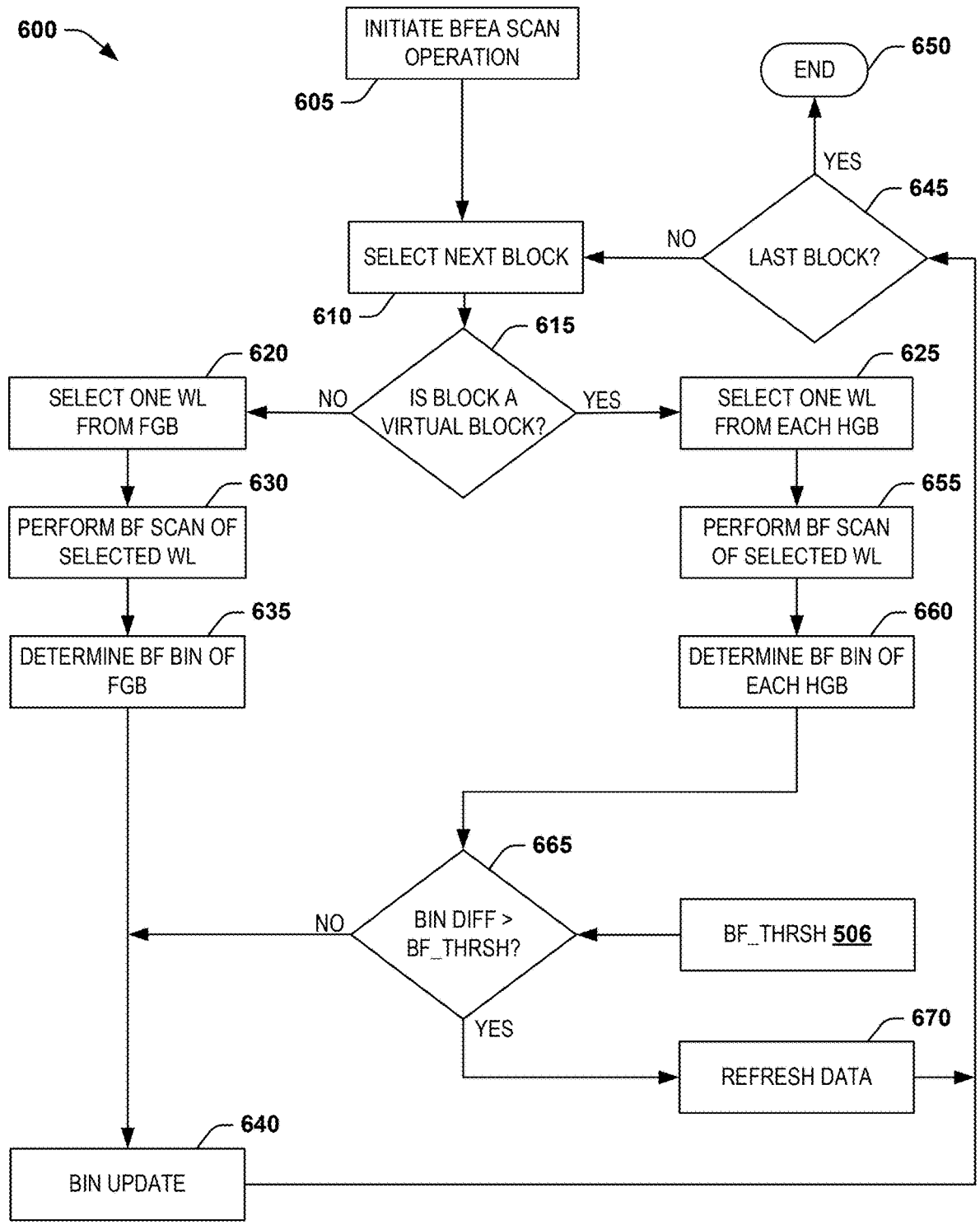
FIG. 6 illustrates an example flow diagram of a method for managing block families of a memory device.

FIG. 6 illustrates a flow diagram of a method 600 of performing a BFEA scan operation on a memory device (e.g., the memory device 130). The method 600 can be implemented, for example, by a controller, such as the memory sub-system controller 115 (e.g., the block family management module 113) of the system 100 of FIG. 1A. The method 600 can thus correspond to the BFEA scan operation described herein. In the example of FIG. 6, the method 600 describes two HGBs of a virtual block 107 for a BF scan. However, the method 600 can also be applicable to a virtual block 107 with any number of fractional good blocks (e.g., TGBs). The method begins at 605, in which the controller initiates a BFEA scan operation of a virtual block 107. The method then proceeds to 610.

At 610, the block family management module 113 selects a next memory block for the BFEA scan operation. If the method 600 arrives at 610 from 605, then the next memory block that is selected is the first memory block that is selected. The method then proceeds to 615. At 615, a determination is made as to whether the selected memory block is a virtual block (e.g., a virtual block 107). If the determination at 615 is negative (e.g., NO), the selected memory block is a physical block that is an FGB, and the method 600 proceeds to 620. If the determination at 615 is positive (e.g., YES), the method 600 proceeds to 625.

At 620, the block family management module 113 selects a wordline from the FGB. The selection is typically a predefined wordline that can represent the charge loss degree of the whole FGB, and the predefined wordline is typically located on the upper deck of the FGB. The method 600 then proceeds to 630. At 630, the block family management module 113 performs a BF scan on the selected wordline to determine the charge loss of the wordline. As described above, the BF scan can determine a voltage shift of one or more highest levels of the memory cells of the selected wordline. The method 600 then proceeds to 635, at which the block family management module 113 determines the BF bin number of the FGB based on the results of the BF scan. The method 600 then proceeds to 640, at which the block family management module 113 provides a bin update by storing the corresponding determined BF bin number of the selected FGB in the BF bin lookup table 504.

The method then proceeds to 645, at which a determination is made as to whether the selected memory block is the last memory block in the BFEA scan operation. If the determination at 645 is positive (e.g., YES), the method 600 proceeds to 650, at which the BFEA scan operation, and thus the method 600, concludes. If the determination at 645 is negative (e.g., NO), then the method 600 proceeds back to 610, at which a next memory block is selected for the BFEA scan operation.

At 625, arrived at if the memory block selected at 610 is a virtual block, the block family management module 113 selects a wordline from each HGB (each fractional good block) of the virtual block. The method then proceeds to 655. At 655, the block family management module 113 performs a BF scan on the selected wordlines of the respective HGBs of the virtual block to determine the charge loss of the respective wordlines. As described above, the BF scan can determine a voltage shift of one or more highest levels of the memory cells of the selected wordline. The method 600 then proceeds to 660, at which the block family management module 113 determines the BF bin number of each of the HGBs based on the results of the separate BF scans. The method 600 then proceeds to 665.

At 665, a determination is made as to whether the difference between the respective BF bin numbers of the fractional good blocks of the virtual block 107 is greater than the BF threshold 506. If the determination at 665 is negative (e.g., NO), then the method 600 proceeds to 640, at which the block family management module 113 provides a bin update by storing an aggregate BF bin number corresponding to the entire virtual block 107 in the BF bin lookup table 504. For example, the aggregate BF bin number can be one of the highest or lowest of the respective BF bin numbers of fractional good blocks of the virtual block 107. The method 600 then proceeds to 645 to either end the BFEA scan operation (at 650) or select the next block (at 610).

If the determination at 615 is positive (e.g., YES), at which the difference between the respective BF bin numbers of the fractional good blocks of the virtual block 107 is greater than the BF threshold 506, the method 600 proceeds to 670. At 670, the block family management module 113 refreshes the data stored in the virtual block 107. As an example, the data refresh can correspond to the block family management module 113 folding the data stored in the virtual block 107, and thus relocating the data to a different memory location in the memory device 130. The method 600 then proceeds to 645 to either end the BFEA scan operation (at 650) or select the next block (at 610). Accordingly, as described in the example of FIG. 6, the method 600 can provide individual BF scanning of fractional good blocks of a virtual block 107 in a BFEA scan operation to mitigate RDCL, bit errors, and/or trigger risks associated with the virtual block 107.

Figure 7:
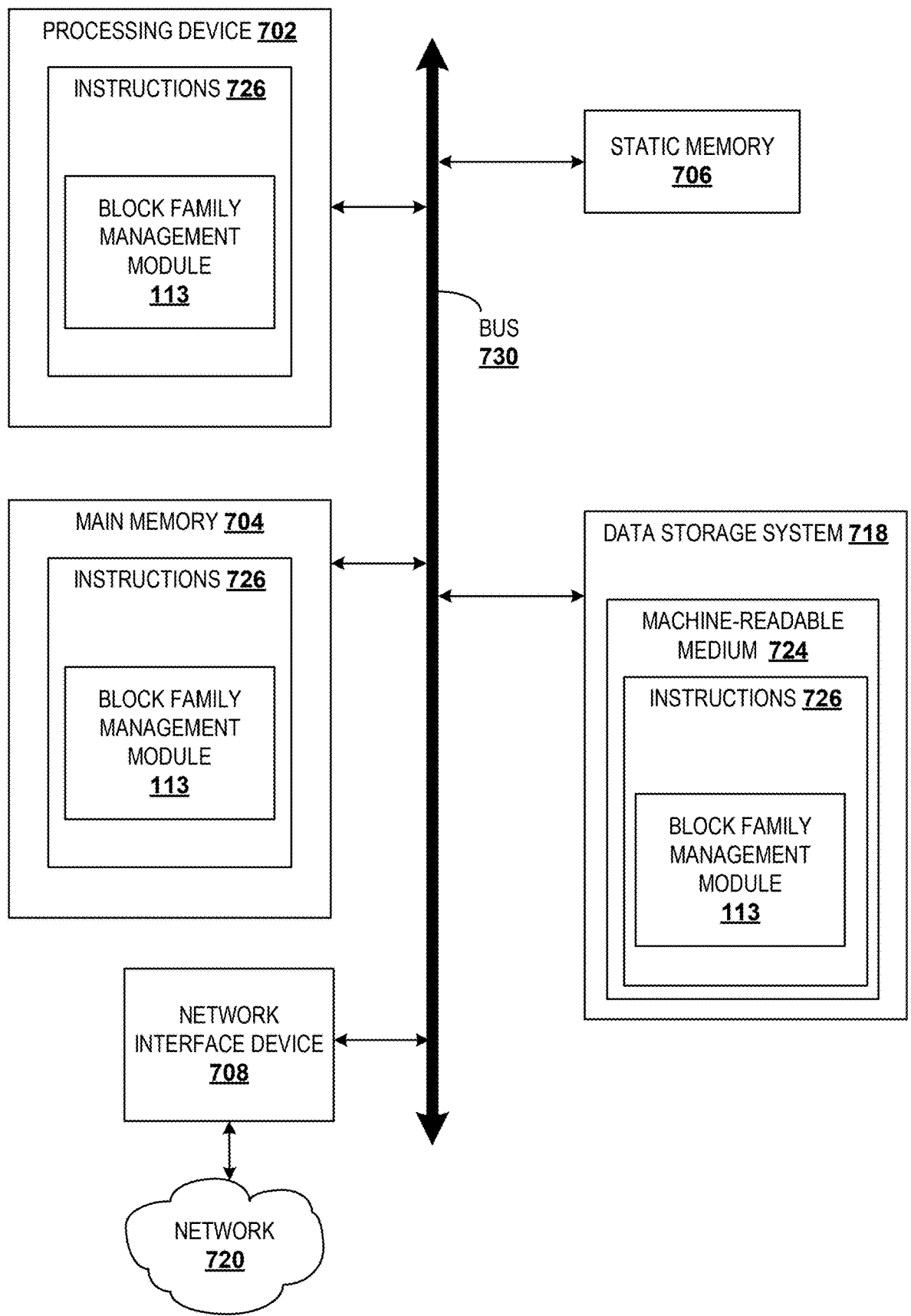
FIG. 7 illustrates an example of a computer system in which examples of the present description may operate.

FIG. 7 illustrates an example machine of a computer system 700 (a machine) within which a set of instructions, for causing the machine to perform any one or more of the methodologies discussed herein, can be executed. In some examples, the computer system 700 corresponds to a host system (e.g., the host system 120 of FIG. 1A) that includes, is coupled to, or utilizes a memory sub-system (e.g., the memory sub-system 110 of FIG. 1A) or is used to perform the operations of a controller (e.g., to execute an operating system to perform operations corresponding to the block family management module 113 of FIG. 1A). In other examples, the machine is connected (e.g., networked) to other machines in a LAN, an intranet, an extranet and/or the Internet. In various examples, the machine operates in the capacity of a server or a client machine in client-server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automotive application, a data center, a smart factory, or other industrial application. Further, while a single machine is illustrated, the term "machine" shall also be taken to include any collection of machines that individually or jointly execute a set (or multiple sets) of instructions to perform the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM) or other non-transitory computer-readable media) and a data storage system 718, which communicate with each other via a bus 730.

The processing device 702 represents one or more general-purpose processing devices such as a microprocessor, a central processing unit, etc. More particularly, the processing device 702 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 702 is implemented with a special-purpose processing devices such as an application specific integrated circuit (ASIC), a field programmable gate array (FPGA), a digital signal processor (DSP), network processor, etc. The processing device 702 is configured to execute instructions 726 for performing the operations discussed herein. In some examples, the computer system 700 includes a network interface device 708 to communicate over the network 720.

The data storage system 718 includes a machine-readable storage medium 724 (also known as a computer-readable medium) that store sets of instructions 726 or software for executing the methodologies and/or functions described herein. The machine-readable storage medium 724 is a non-transitory medium. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718 and/or main memory 704 can correspond to the memory sub-system 110 of FIG. 1A. Accordingly, the machine-readable storage medium 724, the data storage system 718 and/or the main memory 704 are examples of non-transitory computer-readable media.

In some examples, the instructions 726 include instructions to implement functionality corresponding to the block family management module 113 of FIG. 1A. As an example, the instructions can include performing a BF scan on each fractional good block of a virtual block during a BFEA scan operation to mitigate RDCL, bit errors, and/or trigger risks associated with the virtual block. While the machine-readable storage medium 724 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system or similar electronic computing device that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for performing a block family (BF) scan operation of a memory device, the method comprising:
   performing a first block family error avoidance (BFEA) scan via a controller on a wordline of a first fractional good block of a virtual block;
   performing a second BFEA scan via the controller on a wordline of a second fractional good block of the virtual block;
   determining a BF bin number for each of the first and second fractional good blocks via the controller based on the first and second BFEA scans; and
   refreshing data stored in the virtual block via the controller based on the respective BF bin numbers of the first and second fractional good blocks.

2. The method of claim 1, further comprising generating a BF threshold associated with a difference between the BF bin number of the first and second fractional good blocks, wherein refreshing the data comprises refreshing the data stored in the virtual block based on the BF threshold and the respective BF bin numbers of the first and second fractional good blocks.

3. The method of claim 2, further comprising comparing the difference between the respective BF bin numbers of the first and second fractional good blocks with the BF threshold, wherein refreshing the data comprises refreshing the data stored in the virtual block in response to the difference between the respective BF bin numbers of the first and second fractional good blocks being greater than the BF threshold.

4. The method of claim 3, further comprising updating a block BF bin number of the virtual block in a BF bin number lookup table in response to the difference between the respective BF bin numbers of the first and second fractional good blocks being greater than the BF threshold.

5. The method of claim 1, further comprising:
   initiating the BFEA scan operation;
   selecting a block for the BFEA scan operation; and
   determining if the selected block is the virtual block or a physical block,
   wherein performing the first and second BFEA scans comprises performing the first and second BFEA scans on the wordlines of the respective first and second fractional good blocks of the virtual block in response to determining that the selected block is the virtual block.

6. The method of claim 5, further comprising performing a BFEA scan on a wordline of a single deck of the physical block in response to determining that the selected block is the physical block.

7. The method of claim 1, wherein performing the first BF scan comprises measuring a charge loss of the wordline of the first fractional good block of the virtual block, wherein performing the second BFEA scan comprises measuring the charge loss of the wordline of the second fractional good block of the virtual block.

8. The method of claim 7, wherein measuring the charge loss comprises measuring a voltage threshold shift of a highest read voltage level of at least one memory cell of the wordline of each of the respective first and second fractional good blocks.

9. The method of claim 1, wherein refreshing the data comprises folding the data of the virtual block to another location of the memory device.

10. The method of claim 1, further comprising:
    performing a third BFEA scan via the controller on a wordline of a third fractional good block of the virtual block; and
    determining a BF bin number for the third fractional good block,
    wherein refreshing data comprises refreshing the data stored in the virtual block based on the respective BF bin numbers of the first, second, and third fractional good blocks.

11. A system for performing a BFEA scan operation in a memory device, comprising:
    the memory device; and
    a processing device coupled to the memory device, the processing device to perform operations comprising:
      performing a first block family error avoidance (BFEA) scan on a wordline of a first fractional good block of a virtual block;
      performing a second BFEA scan on a wordline of a second fractional good block of the virtual block;
      determining a BF bin number for each of the first and second fractional good blocks based on the first and second BFEA scans; and
      refreshing data stored in the virtual block based on the respective BF bin numbers of the first and second fractional good blocks.

12. The system of claim 11, further comprising comparing a difference between the respective BF bin numbers of the first and second fractional good blocks with a BF threshold, wherein refreshing the data comprises refreshing the data stored in the virtual block in response to the difference between the respective BF bin numbers of the first and second fractional good blocks being greater than the BF threshold.

13. The system of claim 12, further comprising updating a block BF bin number of the virtual block in a BF bin number lookup table in response to the difference between the respective BF bin numbers of the first and second fractional good blocks being greater than the BF threshold.

14. The system of claim 11, wherein performing the first and second BFEA scans comprises measuring a charge loss of each of the respective first and second fractional good blocks of the virtual block based on determining a voltage threshold shift of a highest read voltage level of at least one memory cell of the wordline of the respective first and second fractional good blocks.

15. The system of claim 11, wherein refreshing the data comprises folding the data of the virtual block to another location of the memory device.

16. A non-transitory computer-readable storage medium comprising instructions that, when executed by a processing device, cause the processing device to perform a BFEA scan operation on a memory device, the BFEA scan operation comprising:
performing a first block family error avoidance (BFEA) scan on a wordline of a first fractional good block of a virtual block;
performing a second BFEA scan on a wordline of a second fractional good block of the virtual block based on the first and second BFEA scans;
determining a BF bin number for each of the first and second fractional good blocks; and
refreshing data stored in the virtual block based on the respective BF bin numbers of the first and second fractional good blocks.

17. The medium of claim 16, further comprising comparing a difference between the respective BF bin numbers of the first and second fractional good blocks with a BF threshold, wherein refreshing the data comprises refreshing the data stored in the virtual block in response to the difference between the respective BF bin numbers of the first and second fractional good blocks being greater than the BF threshold.

18. The medium of claim 17, further comprising updating a block BF bin number of the virtual block in a BF bin number lookup table in response to the difference between the respective BF bin numbers of the first and second fractional good blocks being greater than the BF threshold.

19. The medium of claim 16, wherein performing the first and second BFEA scans comprises measuring a charge loss of each of the respective first and second fractional good blocks of the virtual block based on determining a voltage threshold shift of a highest read voltage level of at least one memory cell of the wordline of the respective first and second fractional good blocks.

20. The medium of claim 16, wherein refreshing the data comprises folding the data of the virtual block to another location of the memory device.

* * * * *